(No Model.) 2 Sheets—Sheet 1.

J. B. CORNWALL.
TUBULAR GRAIN SEPARATOR.

No. 569,089. Patented Oct. 6, 1896.

Witnesses
Jos. C. Stack
James R. Mansfield

Inventor
John B. Cornwall
Alexander Boxwell
Attorneys.

(No Model.) 2 Sheets—Sheet 2.

J. B. CORNWALL.
TUBULAR GRAIN SEPARATOR.

No. 569,089. Patented Oct. 6, 1896.

WITNESSES
Jos. C. Stack.
James R. Mansfield.

INVENTOR
John B. Cornwall
By Alexander Howell
Attorneys.

UNITED STATES PATENT OFFICE.

JOHN B. CORNWALL, OF MOLINE, ILLINOIS, ASSIGNOR TO THE BARNARD & LEAS MANUFACTURING COMPANY, OF SAME PLACE.

TUBULAR GRAIN-SEPARATOR.

SPECIFICATION forming part of Letters Patent No. 569,089, dated October 6, 1896.

Application filed November 11, 1895. Serial No. 568,580. (No model.)

*To all whom it may concern:*

Be it known that I, JOHN B. CORNWALL, of Moline, in the county of Rock Island and State of Illinois, have invented certain new and useful Improvements in Tubular Grain-Separators; and I do hereby declare that the following is a full, clear, and exact description thereof, reference being had to the accompanying drawings, and to the letters of reference marked thereon, which form part of this specification.

This invention is an improvement in machines for cleaning grain by means of rotary metallic perforated cylinders; and it consists in the novel construction and combinations of parts set forth in the claims, and the best form of the separator now known to me is described as follows and shown in the accompanying drawings, in which—

Figure 1:
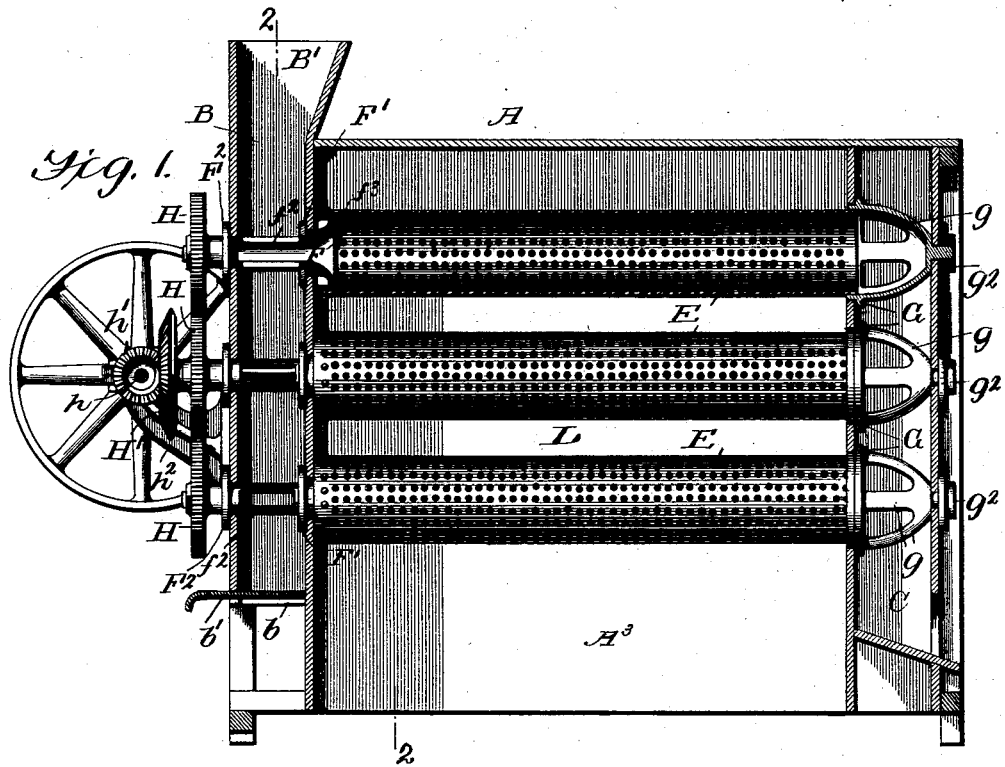
Figure 2:
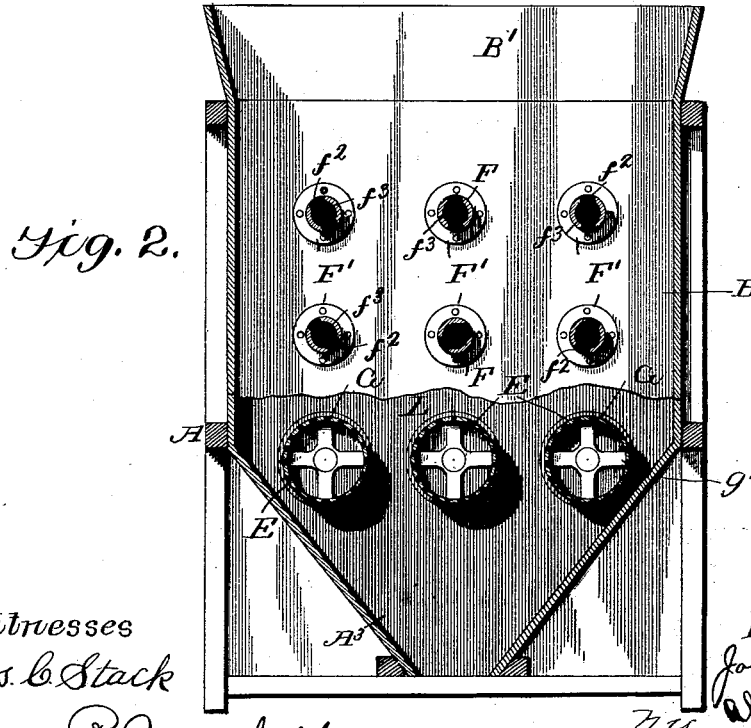
Figure 3:
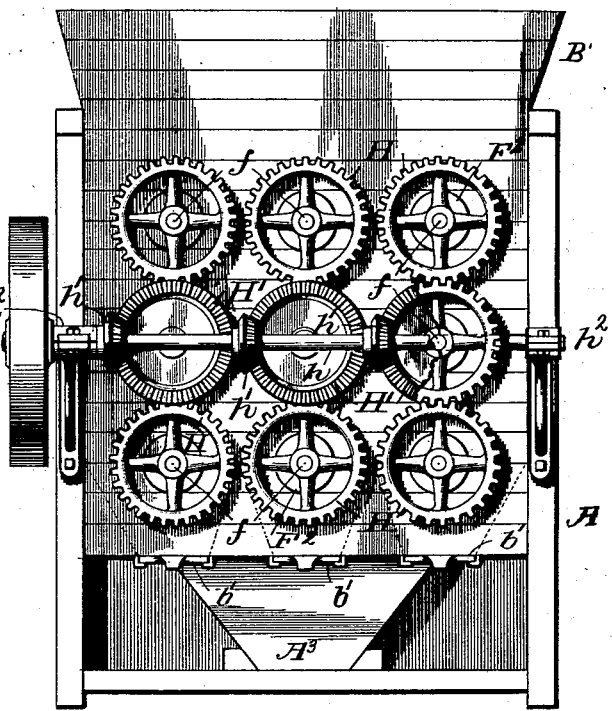
Figure 4:
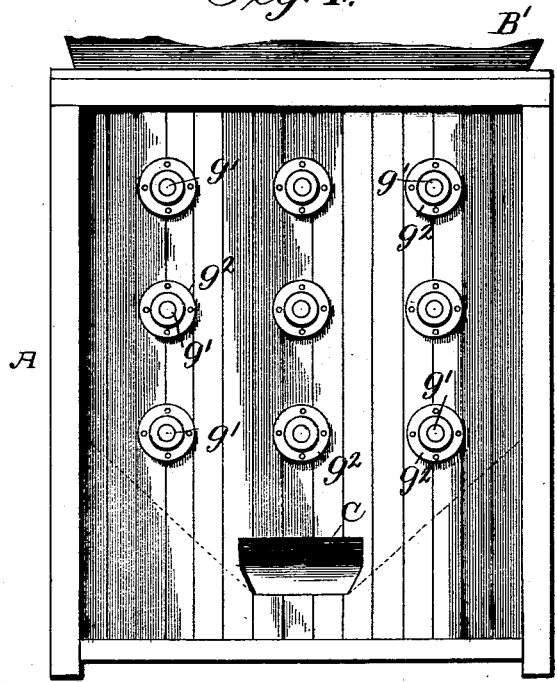
Figure 5:
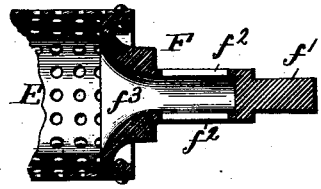
Figure 6:
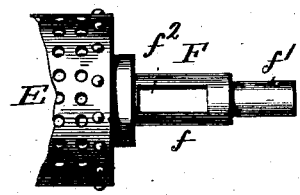

Figure 1 is a vertical longitudinal section of the machine. Fig. 2 is a transverse section on line 2 2, Fig. 1. Fig. 3 is a front view of the machine. Fig. 4 is a rear view thereof. Fig. 5 is a section of the reduced front end of one of the cylinders, and Fig. 6 is a side view thereof.

A designates the frame of the machine, at the front end of which is a transverse feed-chamber B, which has openings $b$ at bottom, closed by slides $b'$, so that it can be emptied of refuse or grain after using. This chamber has a hopper B' above it into which the grain may be spouted from any suitable supply, and in use chamber B should be kept filled with grain, or sufficiently filled to cover the highest set of cylinders.

At the rear end of the machine is a transverse discharge-chamber C, having a hoppered bottom and a discharge-opening, as shown.

Extending longitudinally of the machine from the front of chamber B to chamber C are series of rotary cylinders E, which are arranged in parallel series within the chambers L, both vertically and horizontally. As shown, there are three rows of cylinders and three cylinders in a row. These cylinders are constructed and mounted alike, and a description of one will sufficiently explain all. Each cylinder is composed of metal, preferably of cast-iron and sheet-steel, and perforated with holes suitable for the kind of grain to be cleansed, and the front end of it is made of a cylindrical casting F long enough to pass through the feed-chamber B and made hollow, and has a solid gudgeon $f'$ cast on the end of it. This casting F of the cylinder is less in diameter than the perforated part, so as to give room in the feed-chamber for the grain to pass down between the cylinders to all of the cylinders, and has two lateral openings in the sides for the admission of the grain.

It will be particularly observed that the inner end of casting F is flared or bell-mouthed, thus forming an inclined spout down which the grain slides into the cylinder as said casting revolves. By this construction I am enabled to feed grain in a series of cylinders arranged substantially as described, thereby greatly augmenting the capacity of this class of machines.

The feed-chamber B has suitable openings made in the front and rear walls to accommodate the reduced part F of the cylinders, and plates F' and $F^2$ being attached to the walls of it to prevent the escape of grain from the chamber. The solid gudgeon $f'$, cast on the front end of the cylinder, is supported in the outer bearing $F^2$, thus enabling the bearings to be easily lubricated and making them readily accessible. The rear end of the cylinder is fastened to an annular spider-head G, connected by radial arms $g$ to the gudgeon $g'$, which is journaled in a plate $g^2$, attached to the rear end of the machine. The annular heads G fit into suitable openings in the inner wall of the discharge-chamber C, and the grain passing through the cylinder can escape between arms $g$ into chamber C, as is evident from the drawings, thus receiving and discharging between solid gudgeons, hollow gudgeons being dispensed with.

By referring to the drawings it will be seen that the spiders G are of peculiar shape, roughly approximating a bell or dome shape, the hub being at the apex of the dome and the ring to which the screen is attached being at the base. This construction differs from the ordinary construction in that the radial arms connect with the outer side of the rim rather than with the inner edge thereof, and this construction increases the area of the discharge-outlet at the end of screen and does not interfere with the escape of grain.

On the outer ends of gudgeons $f'$ are secured pinions H, and the pinions on the gudgeons of the cylinders in vertical rows intermesh, as shown. To the gudgeons $f'$ of the central cylinder in each vertical row is also secured a bevel-gear H', which meshes with a bevel-pinion $h'$ on a shaft $h$, journaled transversely of the front end of the machine in suitable bearings $h^2$, attached thereto, and driven by belting and pulleys from any suitable source of power or by other suitable means. Thus the cylinders have a uniform movement imparted thereto, and the power is applied at the end where the greatest weight and resistance is to be found, thereby relieving the cylinders of a great deal of torsional strain and enabling me to dispense with shafting.

The operation of the machine is as follows: Grain is spouted into the chamber B fast enough to keep it full to the top of the upper row of cylinders, thus supplying all the cylinders. As they revolve the grain will enter the cylinders at the openings $f^2$ in each cylinder, and while the impurities are discharged through the perforations as the cylinders revolve the clean grain is discharged through the rear end into the chamber C and passes out through the opening at the bottom of it. The front end of each cylinder has two openings $f^2$, feeding it twice in each revolution, which is almost, if not quite, equal to a continuous feed. This method of feeding gives the same amount of grain to each cylinder, and if the chamber B is kept full of grain all the time as the cylinders revolve in the grain it assures an even and continuous feed without fail. The machine can be made in size suitable to contain as many rows of reels and as many reels or cylinders in each row as may be necessary to give the desired capacity. Having the grain pass into the sides instead of through the ends of the cylinders enables me to use a single hopper to fill all the cylinders instead of double ones. It simplifies the construction of the cylinders, as I am enabled to build them without a central shaft. It enables the journals to be made quite small and arranged to the outside of the machine, where they can be conveniently lubricated. It enables me to drive the cylinders from the point of greatest resistance, thus relieving the perforated cylinders of torsional strain and prolonging their usefulness.

In fine, by the use of the cylinders constructed as described I am enabled to make separators simpler, cheaper, lighter-running, and more durable than any other machines of equal capacity now known to me.

I am aware that machines feeding through hollow gudgeons or journal-bearings have been used, and I disclaim them, as I do not use hollow gudgeons, nor do I feed through any bearings.

Having thus described my invention, what I claim as new, and desire to secure by Letters Patent, is—

1. The combination in a grain-cleaner, having a common discharge-chamber at one end and a common feed-chamber at the other end thereof, of a series of rotary screens each provided with a tubular casting at its forward end, said casting being formed with a gudgeon of less diameter than the cylinder and extending across and journaled in the walls of the feed-chamber, having grain-receiving slots through its sides within the feed-chamber, and an inwardly-flaring or bell-shaped opening which causes the grain to slide into the cylinder, as said casting revolves, all constructed and arranged to operate substantially as and for the purpose described.

2. In a grain-cleaner, the combination of a screening-chamber, a common feed-chamber, at one end thereof, and a common discharge-chamber at the other; with a series of parallel rotary screens each having a casting, on its front end; said casting being formed with a gudgeon of less diameter than the cylinder and extending across and journaled in the walls of the feed-chamber having grain-receiving slots in its sides substantially as described, and an inwardly-flaring or bell-shaped opening in its inner end from which the grain slides into the cylinder, as said casting revolves; a bell or dome shaped spider G connected to and supporting the rear end of each screen within the common discharge-chamber; and means for rotating said screens, all substantially as and for the purpose described.

3. In a grain-cleaner, the combination of the screening-chamber, a common feed-chamber at one end, and a common discharge-chamber at the other end thereof; with a series of horizontal parallel screens E, arranged in the screening-chamber; castings F fastened to and supporting the front ends of the screens, said castings each having grain-receiving slots in its sides within the feed-chamber, and an inwardly-flaring or bell-shaped opening in its inner end from which the grain slides into the cylinder, as said casting revolves; said casting being also provided with gudgeons $f'$ extending across and journaled in the walls of the feed-chamber and the spiders G in the common discharge-chamber attached to the rear ends of the screens, the intermeshing gears on the gudgeons of the castings F, exterior to the feed-chamber, and the shafts and bevel-gearing for imparting motion thereto, all constructed and arranged to operate substantially as and for the purpose described.

4. In a grain-cleaner the combination of a series of parallel rotary perforated screens each having a casting F at its forward end, said casting having grain-receiving slots in its sides within the feed-chamber, and an inwardly-flaring or bell-shaped opening from which the grain slides into the cylinder, said casting also having a gudgeon on its outer end extending across and journaled in the walls of the feed-chamber, and an opening at the rear end of said screens for the discharge of the grain, the rear end of each screen being connected to and supported by a bell or dome shaped spider G within the common discharge-chamber; and means for rotating said screens, all constructed and arranged to operate substantially as and for the purpose described.

In testimony that I claim the foregoing as my own I affix my signature in presence of two witnesses.

JOHN B. CORNWALL.

Witnesses:
J. S. LEAS,
WM. C. BENNETT.